(12) United States Patent
Brown et al.

(10) Patent No.: US 8,201,747 B2
(45) Date of Patent: Jun. 19, 2012

(54) AUTO-SEQUENCING FINANCIAL PAYMENT DISPLAY CARD

(75) Inventors: Kerry D. Brown, Portola Valley, CA (US); Daniel Chatelain, Emerald Hills, CA (US)

(73) Assignee: QSecure, Inc., Los Altos, CA (US)

( * ) Notice: Subject to any disclaimer, the term of this patent is extended or adjusted under 35 U.S.C. 154(b) by 429 days.

(21) Appl. No.: 12/324,617

(22) Filed: Nov. 26, 2008

(65) Prior Publication Data

US 2010/0127083 A1 May 27, 2010

(51) Int. Cl.
*G06K 19/06* (2006.01)
(52) U.S. Cl. ...... 235/492; 235/493; 235/494; 235/382.5; 705/41
(58) Field of Classification Search .................. 235/492, 235/493, 494, 382.5; 705/41
See application file for complete search history.

(56) References Cited

U.S. PATENT DOCUMENTS

| | | | |
|---|---|---|---|
| 2006/0081700 A1* | 4/2006 | Li | 235/380 |
| 2007/0131780 A1* | 6/2007 | Ho | 235/492 |
| 2008/0067247 A1* | 3/2008 | McGregor et al. | 235/439 |
| 2008/0071681 A1* | 3/2008 | Khalid | 705/41 |
| 2008/0099556 A1* | 5/2008 | Park | 235/382.5 |
| 2008/0308629 A1* | 12/2008 | Roskind | 235/382 |
| 2009/0308921 A1* | 12/2009 | Mullen | 235/382 |

* cited by examiner

*Primary Examiner* — Allyson Trail (57) ABSTRACT

A payment card comprises a store of issuer-defined pre-generated cryptograms that are loaded only once into the Card by a perso-bureau or issuer. An on-board and autonomous electronic display of the personal account number (PAN), card verification value (CVV), or expiration date (EXP) is auto-sequenced through the stored cryptograms. Each value displayed to the user is unique, and useful in a financial transaction only once. The Card thus requires no changes in behavior on the part of the User, because the existing merchant infrastructure is already equipped to collect PAN+CVV+EXP data for user verification and transaction authorization.

1 Claim, 10 Drawing Sheets

AUTO-SEQUENCING FINANCIAL PAYMENT DISPLAY CARD

BACKGROUND OF THE INVENTION

1. Field of the Invention

The present invention relates to payment cards, and in particular to cards that continuously display dynamic, use-once financial data for use in credit and debit card-not-present transactions.

2. Description of Related Art

A principal security weakness of conventional credit and debit cards is the static nature of the personal account number (PAN), card verification value (CVV), or expiration date (EXP). These can be easily copied down on paper and used over and over by fraudsters, especially in card-not-present transactions on the Internet or over the telephone where the actual possession of the card cannot be verified by the merchant.

Smart cards are more secure because they can engage in cryptographic exchanges with merchant card readers. But smart cards cannot be used in card-not-present transactions, because there is no card reader available or adopted for such a purpose.

QSecure, Inc. (Los Altos, Calif.) has developed a series of payment cards that place dynamic elements in the magnetic stripes of otherwise conventional payment cards. The great advantage is the vast installed based of legacy card readers are able to read the magnetic data as usual. The security benefits are that portions of the PAN, CVV, and/or EXP fields, discretionary fields, among others, can be implemented to be dynamic and use-once. But dynamic magnetic stripes are of minimal value in card-not-present transactions because there is no magnetic card reader being used. The so-called Mobile Order Telephone Order (MOTO) is an example of such transactions.

Tokens have recently become a widespread method to secure access to sensitive files, accounts, and data. A key-fob type of token is a familiar device with a pushbutton and display that will generate a six-digit numeric password, for example, that can be used to access bank accounts on-line with the Internet. Supporting these tokens requires a new and separate infrastructure that is not a part of the typical Visa-Mastercard payment processing. And, of course, a separate token device must be carried.

Token One time Password (OTP) devices are widely used on private banking and other proprietary networks. But, their formats are unusable in broad networks like Pulse, Star, and other networks that agree on standardized, published formats to convey financial card data.

Credit card and debit card use have become ubiquitous throughout the world. Originally, credit cards simply carried embossed numbers that were pressed against a carbon copy bank draft in a mechanical card-swiping machine. Merchants simply accepted any card presented, but then fraud became widespread. The used carbons could even be gathered from trashcans to glean account numbers for unauthorized transactions.

Imposing spending limits and issuing printed lists of lost/stolen cards proved relatively ineffective in preventing fraud and other financial losses. So, merchants were subsequently required to telephone a transaction authorization center to get pre-approval for transactions.

These pre-approvals were initially required only for purchases above a certain limit, but, as time went on, these transaction limits decreased such that more and more transactions required authorization. The volume of telephone traffic increased, the costs associated with each transaction escalated, and customers grew impatient, waiting for authorization calls to complete.

To speed up the authorization process and create an additional barrier for fraudsters, magnetic stripes were added to the embossed numbers and signature panel on credit cards.

Automated authorization systems appeared almost everywhere that allowed faster and easier transactions by reading and verifying the magnetic stripes on the backs of the cards and then handling the authorization process (for those transactions requiring verification) through a communications link. The card readers and computers improved the speed and accuracy of transaction processing and decreased the number of costly human errors. They also allowed near real-time control of fraudulent card usage. But detecting and reacting appropriately to fraud remained a problem.

Several of the elements which are embossed and magnetically recorded on MasterCard, Visa, and other typical payment cards are there to uniquely identify the account cardholder. A standardized personal account number (PAN) comprises four fields, e.g., a system/association number, a bank/product number, a user account number, and a checksum character. This PAN is typically sixteen digits but may be up to nineteen digits, and possibly more in future. Typically, the first six digits are called a BIN and represent the card network, the bank and the product for this bank. The last digit is reserved for a calculated value based on the previous digits of the PAN. This digit is calculated using the Luhn's modulus formula and assures some measure of data integrity vis-à-vis the PAN digits. The field sizes within the PAN may vary some by issuer.

In addition to the PAN, each card has an associated expiration date which comprises a month and year code, e.g., four more digits, but with limited range. The cardholder's name and/or business are also usually embossed on the face of the card and all of this data is also typically encoded within the magnetic stripe on the back of the card.

To reduce the level of fraud, several security features have been added to payment cards. The PIN code is primarily used for debit card-present transactions. Since this PIN must be hidden from everyone but the cardholder, such must be entered on secure and certified machines to make sure that no one can gain access to such. The PIN is typically stored on the magnetic stripe of the card in an encrypted form within a cryptogram block. A prior art example is the so-called, Verified by Visa, where a user can associate a PIN with a credit or debit card transaction, if the merchant terminal allows it.

Since it was relatively easy for a fraudster to copy the PAN and expiration date of a card and create a copy of that card, the banks introduced a Card Verification Value (CVV) or Card Verification Code (CVC) on the magnetic stripe to make it more difficult for fraudsters to replicate a card (without reading the magnetic stripe). This code is usually a unique cryptogram, created based on the card data and the bank's master key. As a consequence, a fraudster had to gain possession of the card long enough to make a copy of the magnetic stripe in order to duplicate the card.

The same principle was adopted later for a second CVC, sometimes called "CVV2" or "4DBC" The CVV2 is commonly printed in the signature panel on the back of the card, and the 4DBC on the front of the card. For example, during a personalization phase that may be separate from the card manufacturing phase in order to add more security. CVV2 and 4DBC are used primarily to help secure eCommerce and Mail Order/Telephone Order (MOTO) transactions. A second unique cryptogram created from card data and the bank's master key, albeit different than the magnetic stripe CVC. The CVV2/4DBC is conventionally not present on the magnetic stripe.

There are two major types of transactions, "card-not-present" transactions which involve Internet/eCommerce and MOTO (mail-order/telephone-order) transactions, and "Card-Present" transactions which involve point-of-sale (POS) readers, manual swipe readers, and Automatic Teller Machines (ATM) transactions. Card-Present transactions involve magnetic card readers and always use the full 16-digit PAN (17 digits w/AMEX) and the 4-digit expiration date. The number of digits used may increase in the future, and some card associations have said the embossed information will be replaced by simple printing, to prevent simple swipe-copying of the data. card-not-present transactions require the user to read the embossed PAN and expiration date digits, and sometimes also the CVC/CVV2/4DBC number.

A principal way to stop fraudulent use of a stolen or compromised account number has been to simply cancel the old account number and issue a new one with a new expiration date. So, the issuing banks put in place a mechanism to invalidate old account numbers and to issue new numbers to existing users. But getting the new card could sometimes take weeks, and the delay would greatly inconvenience the user and cause a lull in spending.

With the emergence of eCommerce, more and more transactions are becoming card-not-present transactions. This type of transaction is subject to an increasing number of attacks from fraudsters. Several solutions to address this growing fraud have been developed and deployed. Such include use of Virtual Account numbers, authentication of cardholders separate from transaction, and use of hardware token to authenticate the user.

For example, American Express introduced a service called "Private Payments," Orbiscom (Ireland) has "Controlled Payment Numbers," and Discover Desktop and Citibank (New York) have similar products referred to as a "Virtual Account Numbers". All of these solutions allow cardholders to shop online without having to transmit their actual card details over the Internet. Instead, these systems generate substitute single-use credit card numbers for secure online purchasing. The virtual number generator, or receiver/authenticator is either downloaded to the user's computer or accessed online. The user returns to the website for another new virtual number for subsequent transactions. Neither the merchant nor a card-number skimmer can use the number after its first use. So, seeing or having the virtual account number will do them no good if the user has already completed the intended transaction. The user is thus protected from fraudulent transactions because the virtual number is moved to an exclusion list. This also prevents an authorized merchant from automatically initiating future charges that a user may not have really agreed to nor been aware of.

A limitation with using Virtual Account Numbers is such requires the use of the Internet or at least a personal computer to get each new number, and the transactions must be online. POS or ATM use with magnetic card readers still obtain the real account number and continue to be subject to fraud.

Another example is Visa that has developed and is providing Verified by Visa to its member banks. This service once adopted by a bank is used by its customers at merchants' sites equipped to handle this type of transaction at checkout. The concept is when a customer wants to pay, he/she receives directly from the issuing bank a request on the screen to authenticate him/herself with a login and password. This way, the issuer knows that the right person is making the purchase.

Another example is the use of token authentication numbers. These tokes are cryptographically generated numbers generated by a small handheld fob device or card that are used to identify the account holder. The usually interact with an intermediary or the issuer's IT system for verification of the account holder. They do not interact directly, and are not directly associated with the PAN or user account data.

So what is needed is an auto-sequencing financial payment display card that can autonomously and visually change at least some portions of the PAN, CVV, and/or EXP fields to produce use-once combinations that secure every transaction.

SUMMARY OF THE INVENTION

Briefly, a card embodiment of the present invention comprises a store of issuer-defined pre-generated cryptograms that are loaded only once into the Card by a perso-bureau or issuer. An on-board and autonomous electronic display of the personal account number, card verification value, or expiration date, or other financial data field, is auto-sequenced through the stored cryptograms. Each value displayed to the user is unique, and useful in a financial transaction only once. The Card thus requires no changes in behavior on the part of the User, because the existing merchant infrastructure is already equipped to collect all the data for user verification and transaction authorization.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figures 1, 2:
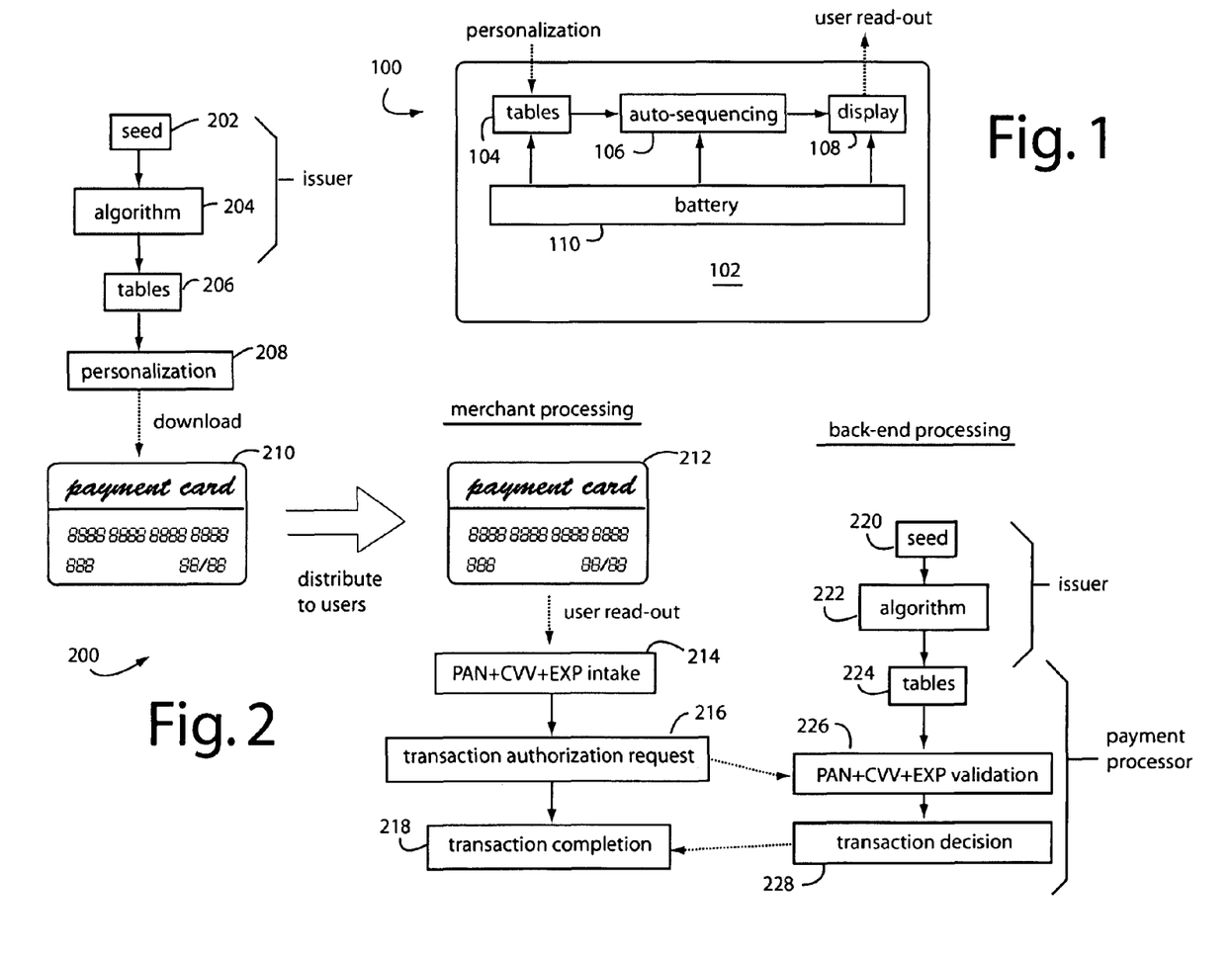
FIG. 1 is a functional block diagram of a payment card embodiment of the present invention that is loaded once with tables of crypto values and then auto-sequences them to an on-board display of use-once PAN+CVV+EXP data.
FIG. 2 is a functional block diagram of a financial system embodiment of the present invention that supports and involves payment cards like that of FIG. 1.

FIG. 1 represents a payment card embodiment of the present invention, and is referred to herein by the general reference numeral 100. Payment card 100 comprises a standard sized plastic card body 102 into which are disposed a table memory 104, an auto-sequencer 106, a numeric user display 108, and a battery 110. Other electronic components may also be included for purposes related to security, basic functionality, and making financial transactions.

A conventional or QSecure type SMARTSTRIPE magnetic stripe may be also included on the back of card 100, but such is not a necessary part of the functioning described here. Such magnetic stripe would further permit card-present transactions with legacy card readers at merchant locations.

Card 100 is principally provided for card-not-present transactions over the Internet, or by telephone, in which the user reads-off the personal account number (PAN), card verification value (CVV2), and expiration date (EXP) displayed in whole or in part on the user display 108. The PAN is usually presented as four groups of four digits, the CVV as three or four digits, and the EXP as a two-digit month and a two-digit year. Any or all of these digits can be dynamic and are continuously on so the user can read them simply by looking.

In conventional payment cards, the CVV is commonly printed in the signature panel on the back of a card. A second CVV, herein called "4DBC", is placed on the front of card 100 in alternative embodiments, as in FIG. 4A. The 4DBC is used primarily to help secure eCommerce and Mail Order/Telephone Order (MOTO) transactions. A unique cryptogram can be created from card data and the bank's master key, albeit different than the magnetic stripe CVV. The 4DBC data is not recorded on the magnetic stripe 404, as in FIG. 4B.

The standard sized plastic card body 102 conforms, for example, to format standards ISO-7810, ISO-7811/1:6, and ISO-7813, published by the American National Standards Institute (NYC, N.Y.). A typical size is 85.47-85.72 mm wide, 53.92 mm-54.03 mm wide, and 0.76 mm+0.08 mm thick. The ISO standards specify the physical characteristics of the cards, embossing, magnetic stripe media characteristics, location of embossed characters, location of data tracks 1-3, high-coercivity magnetic stripe media characteristics, and financial transaction cards. A typical Track-1, as defined by the International Air Transport Association (IATA), is seventy-nine alphanumeric 7-bit characters recorded at 210-bits-per-inch (bpi) with 7-bit encoding, Track-2, as defined by the American Bankers Association (ABA), is forty numeric characters at 75-bpi with 5-bit encoding, and Track-3 (ISO-4909) is typically one hundred and seven numeric characters at 210-bpi with 5-bit encoding. Each track has starting and ending sentinels, and a longitudinal redundancy check character (LRC). The Track-1 format includes user primary account information, user name, expiration date, service code, and discretionary data. These tracks conform to the ISO/IEC Standards 7810, 7811/1-6, and 7813, etc.

The table memory 104 is loaded once during card personalization with a set of cryptogram values pre-computed for the particular card and/or user, typically by the issuer. These values are not useful in compromising other cards, accounts, or users, even if completely hacked because they are cryptographic results, rather than keys and algorithms. There are a sufficient number of cryptogram values in each table in memory 104 to allow normal usage over the estimated life of the card. Such variations include recycling number or algebraic computations capable by the microprocessor and battery limitations.

The end of life of card 100, especially the approaching full discharge of battery 110, can be annunciated in a concealed way by causing a special, but still valid PAN+CVV+EXP combination to be presented on display 108. This can then be detected in back-end processing by a payment processor, e.g., to trigger the issuance of a new card to the user. Alternatively, the back-end processor may keep track of the number of transactions, or frequency of usage, to enable mailing of a new card prior to estimated battery expiration.

The auto-sequencer 106 fetches each value from a table in memory 104 in a predictable sequence and forwards them for a limited time to be read off user display 108 as some part or all of the PAN+CVV+EXP. As added security, the values stored in table memory 104 are encrypted values that are decrypted as they are being passed to the user display 108. The displayed values may also require the user to add their own personal cipher, e.g., add "7" to the last number, swap the last two digits, read the number backwards, etc.

What triggers the auto-sequencer to fetch the next value from the table memory 104 can come from a real-time-clock (RTC), a card swipe sensor, a declining-charge measurement of the voltage decay of battery 110 over its expected life, a received radio signal, a light detector, a Hall-effect device, a microphone, a pushbutton, etc.

User display 108 can be as modest as a few digits of the PAN+CVV+EXP being implemented with a liquid crystal display (LCD), or as ambitious as the whole appearance of the card and its logos and all the PAN+CVV+EXP digits being presented in color as one image using electronic paper (e-paper) displays (EPD). E-Ink Corporation (Cambridge, Mass.) is one company producing high resolution active matrix displays, using its VIZPLEX technology, a micro-encapsulated ink imaging film.

FIG. 2 represents a financial system 200 in an embodiment of the present invention. A seed value 202 is used in a cryptoprocessor 204 with a secret algorithm to produce a table of values 206 unique to a particular payment card user, account, or card. These elements can be secured within a card issuer's protected environment, and only the table of values 206 needs to be communicated to a card personalization contractor (perso-bureau). Any compromise of the table of values 206 affects only those cards actually scheduled for personalization, and not all the issuer's cards, accounts and users, as would be the case if the seeds 202 and algorithms in cryptoprocessor 204 were exposed. Alternatively, a cryptoprocessor may be utilized with keys and algorithms installed, similar to the EMV, and other, smartcards presently in use in some areas of Europe and Asia.

A unique table of values 206 is downloaded by a personalization process 208 into a table memory disposed in each payment card 210 in a population of cards then being issued and distributed. The download is permanent, and write-once. The download can be serially communicated through special contacts for that purpose, or done wirelessly or inductively. Once programmed, a fuse-link is blown, or OTP code-lock, to prevent further access.

A particular payment card 212 circulating in the general population of valid cards is presented to an Internet or telephone-order merchant as financial payment by a user. The user simply reads-off the PAN–CVV–EXP displayed at the moment on the payment card 212 to the merchant. A PAN+CVV+EXP intake process 214 collects the required information and forwards it all to a transaction authorization request process 216. A transaction completion process 218 receives an answer from the payment processor that the transaction was approved or declined.

A back-end process in a secure environment includes a seed value 220 that is fetched from an issuer database according to issuer records of appropriate values for particular payment card 212. A corresponding algorithm associated with particular payment card 212 is fetched and loaded into a crypto-processor 222. These are then able to reproduce a table of values 224 that are unique to the particular payment card 212, and the last valid table value presented in a previous transaction is also earmarked.

A payment processor then only needs access to the tables of values 224 for particular payment cards 212 that it is challenged to process. These could be warehoused in bulk beforehand, or demanded in real time as transactions are presented. A PAN+CVV+EXP validation process 226 receives transaction authorization requests. It tests the PAN+CVV+EXP value received against what was expected, or within limits, given the last table value used. A transaction decision process 228 issues an approval or declines the transaction. A very wrong PAN+CVV+EXP value received can be used to trigger a security alert. Particular PAN+CVV+EXP values received can also be used to inform the merchant of a user's qualification for a coupon, affinity reward, or other promotion.

Figure 3A:
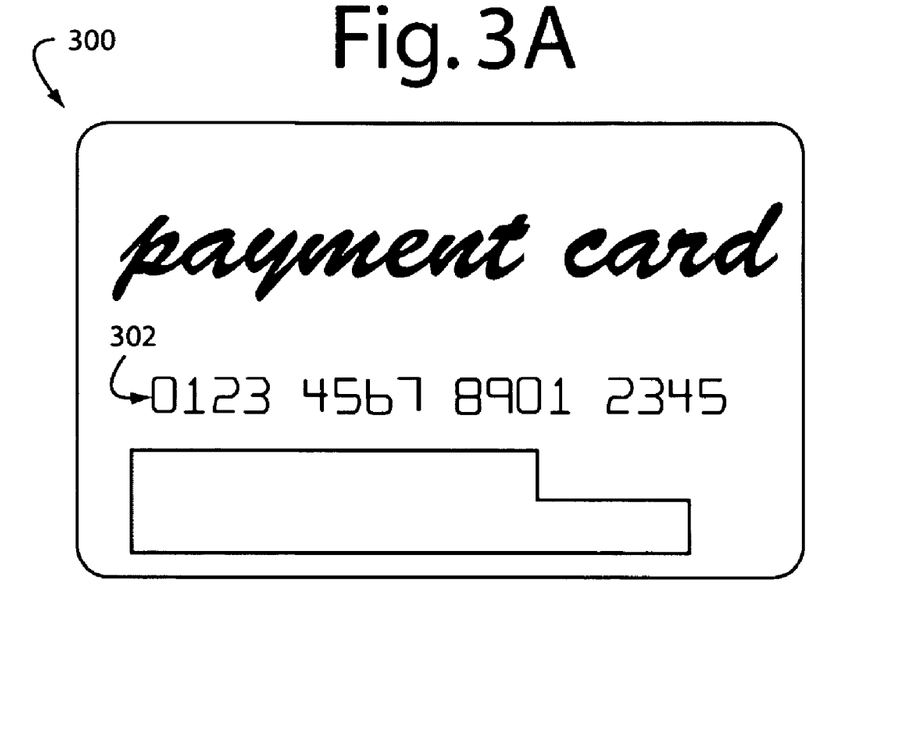
FIGS. 3A and 3B are front and back views of a 3CVV-type payment card embodiment of the present invention that uses an electronic display for only the three digits of the CVV value, and that uses standard embossing to show the PAN field. A QStripe device in the magnetic stripe is not necessarily included.
Figure 3B:
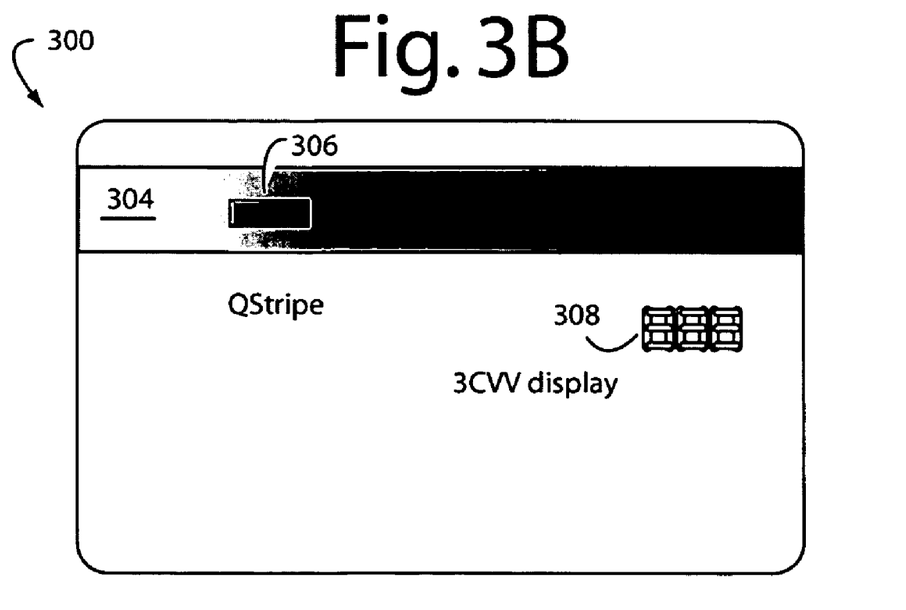

FIGS. 3A and 3B show a three digit, 3CVV-type display card 300 in an embodiment of the present invention. In the front view of FIG. 3A, a 16-digit PAN 302 is embossed in the plastic as is conventional. In some embodiments, a magnetic stripe 304 on the reverse side, as seen in FIG. 3B, includes a QStripe device 306 that makes a few of the magnetic data bits dynamic and autonomously programmable by the card 300 itself. A 3CVV display 308 corresponds to user display 108 in FIG. 1.

Figure 4A:
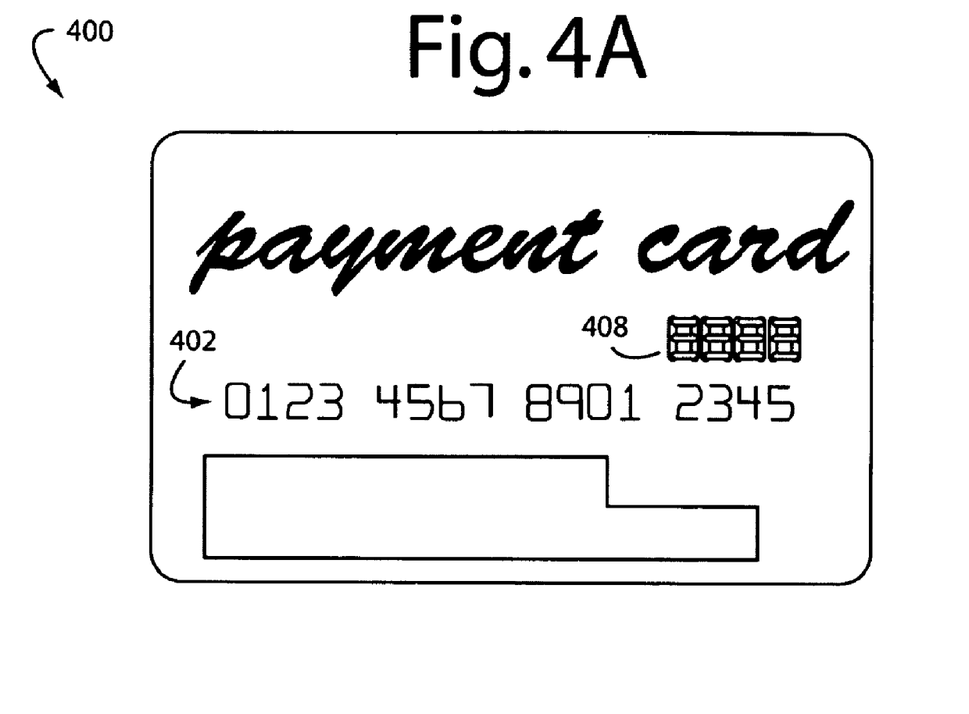
FIGS. 4A and 4B are front and back views of a 4DBC-type payment card embodiment of the present invention that uses an electronic display for only the four digits of the DBC value, and that uses standard embossing to show the PAN field. A QStripe magnetic stripe encoding device is not necessarily included.
Figure 4B:
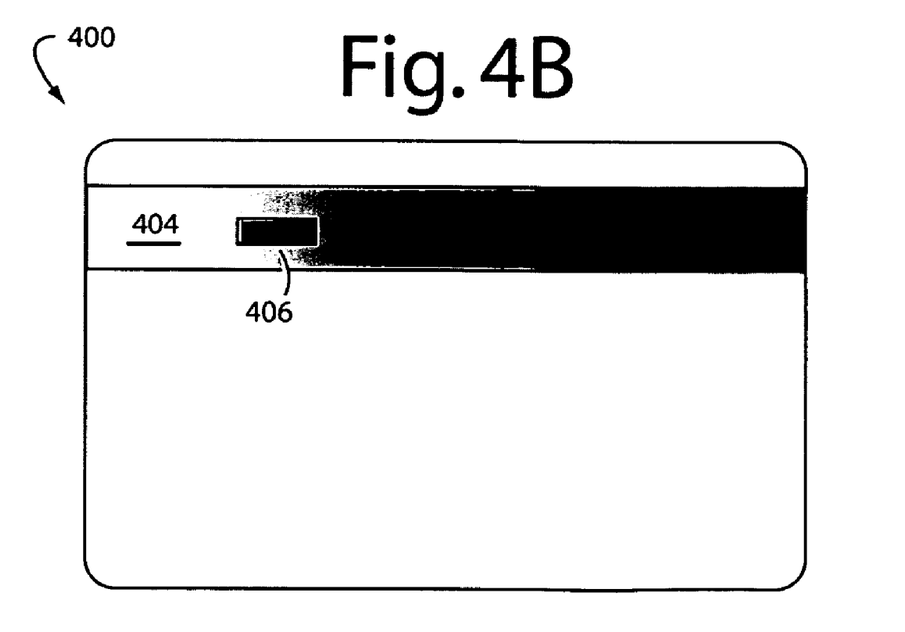

FIGS. 4A and 4B show a 4DBC-type display card 400 in an embodiment of the present invention. In the front view of FIG. 4A, a 16-digit PAN 402 is embossed in the plastic as is conventional. In some embodiments, a magnetic stripe 404 on the reverse side, as seen in FIG. 4B, includes a QStripe device 406 that makes a few of the magnetic data bits dynamic and autonomously programmable by the card 400 itself. A 4DBC display 408 in FIG. 4A corresponds to user display 108 in FIG. 1.

Figure 5A:
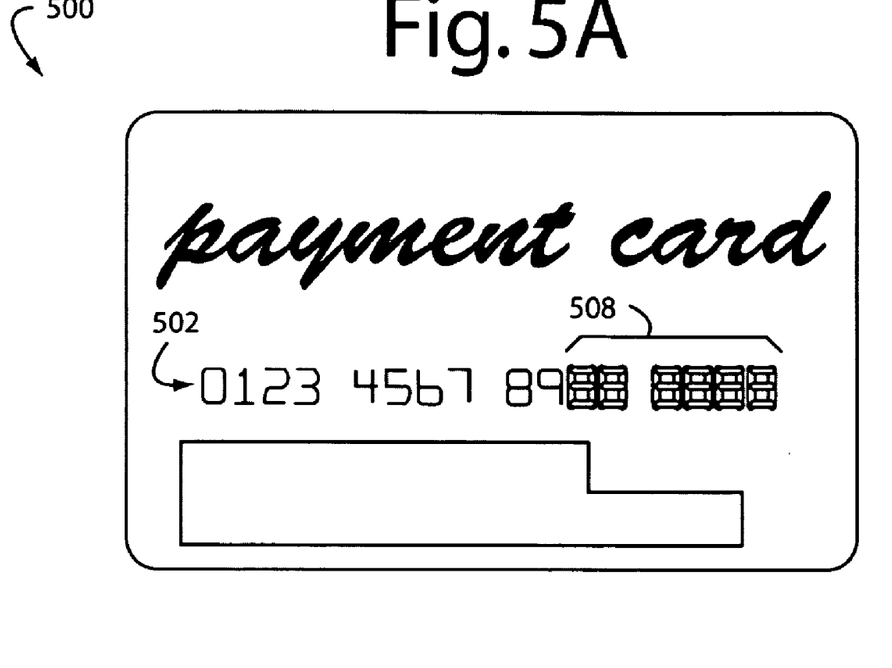
FIGS. 5A and 5B are front and back views of a partial PAN-type payment card embodiment of the present invention that uses an electronic display for only some of the digits of the PAN value, and that uses standard embossing to show the remaining PAN field. A QStripe device in the magnetic stripe is not necessarily included.
Figure 5B:
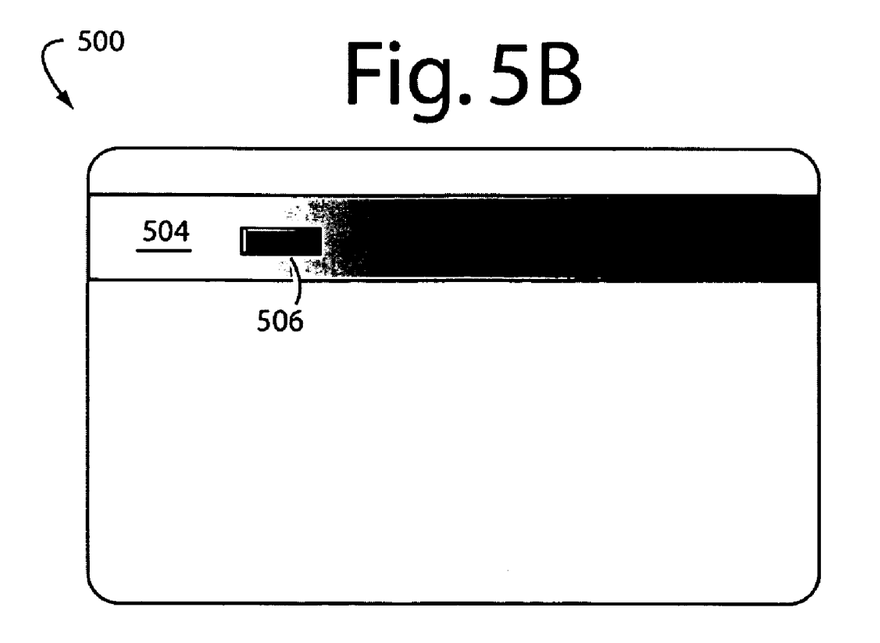

FIGS. 5A and 5B show a partial PAN-type display card 500 in an embodiment of the present invention. In the front view of FIG. 5A, a portion of a 16-digit PAN 502 is embossed in the plastic, as is conventional. In some embodiments, a magnetic stripe 504 on the reverse side, as seen in FIG. 5B, includes a QStripe device 506 that makes a few of the magnetic data bits dynamic and autonomously programmable by the card 500 itself. A partial-PAN display 508 in FIG. 5A corresponds to user display 108 in FIG. 1.

Figure 6A:
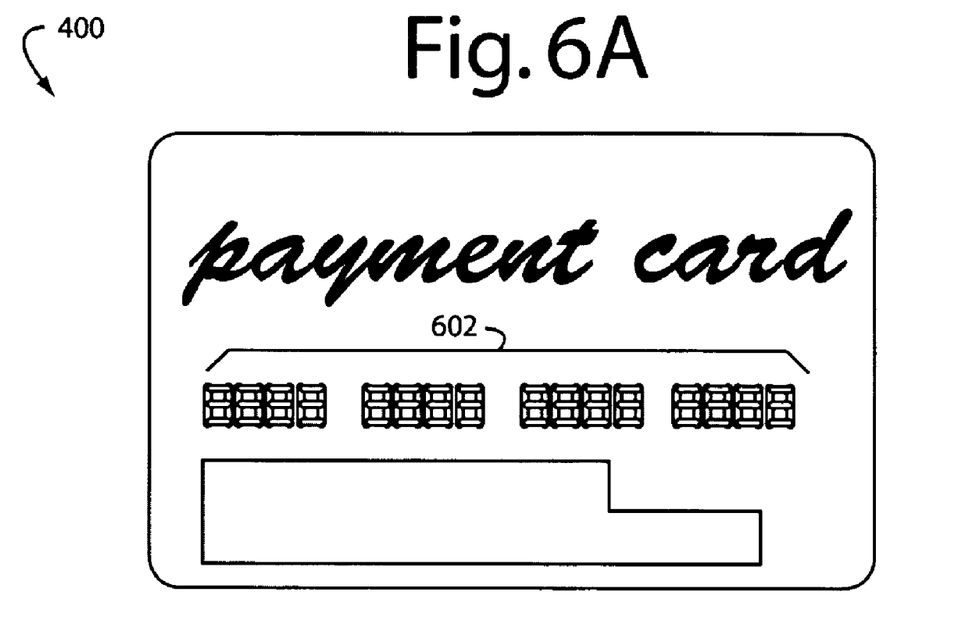
FIGS. 6A and 6B are front and back views of a full PAN-type payment card embodiment of the present invention that uses an electronic display for all the three digits of the PAN value. The CVV/CVV2 and EXP values can be printed and/or embossed as usual. A QStripe device in the magnetic stripe is not necessarily included.
Figure 6B:
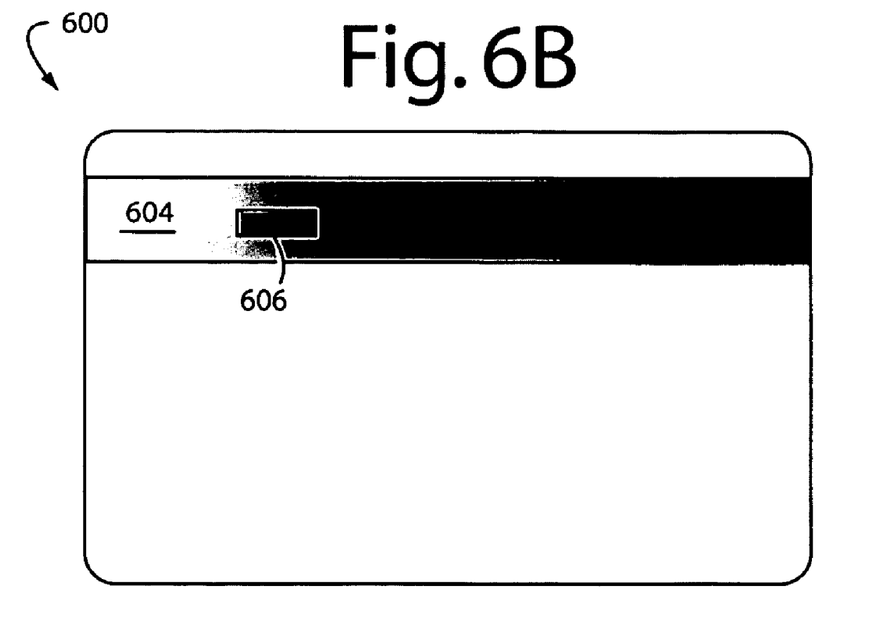

FIGS. 6A and 6B show a full PAN-type display card 600 in an embodiment of the present invention. In the front view of FIG. 6A, a 16-digit PAN 602 is completely implemented with an electronic display. In some embodiments, a magnetic stripe 604 on the reverse side, as seen in FIG. 6B, includes a QStripe device 606 that makes a few of the magnetic data bits dynamic and autonomously programmable by the card 600 itself. The PAN display 602 in FIG. 6A corresponds to user display 108 in FIG. 1.

Display cards 300, 400, 500, and 600, all include the functional components described for payment card 100 in FIG. 1.

Figure 7:
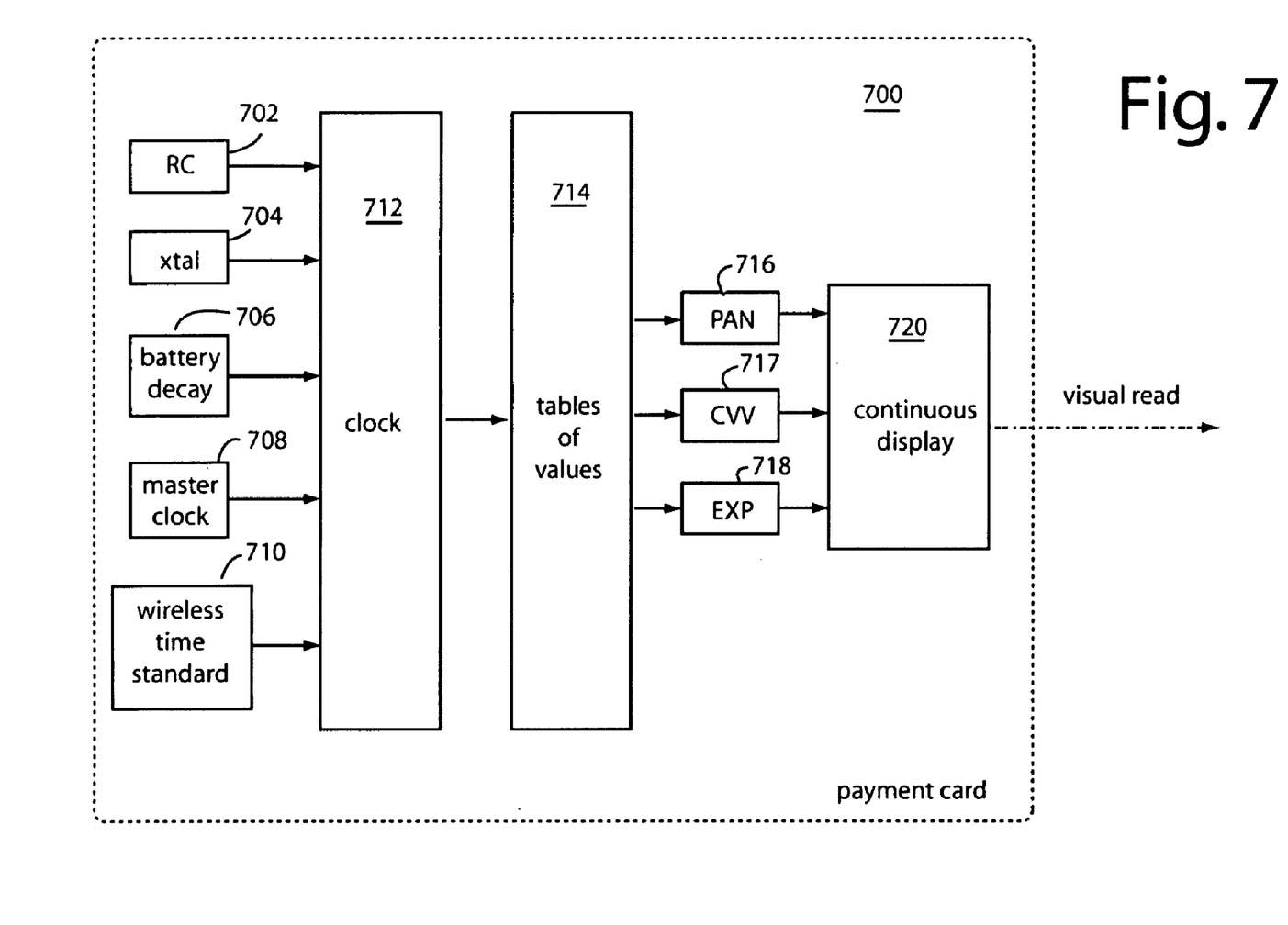
FIG. 7 is a functional block diagram of a payment card embodiment of the present invention in which resistor-capacitor, crystal, battery decay, master clock, and wireless time standards are used to control a clock that sequences through a table of crypto values that are then used to display the PAN+CVV+EXP fields on-board.

FIG. 7 represents a payment card embodiment of the present invention, referred to herein by the general reference numeral 700. Payment card 700 includes a resistor-capacitor (RC) 702, a crystal (XTAL) 704, a battery decay 706, a master clock 708, or a wireless time standard (WWV) 710 that are used to control an auto-sequencing clock 712 that steps through an ordered table of crypto values 714. The selected table values that are then used to grow the PAN+CVV+EXP fields 716-718 for an on-board continuous display 720. The particular mix of values programmed permanently into the ordered table of crypto values 714 is unique to the particular payment card 700 and of no value in compromising any other payment card. The whole list of values in the ordered table of crypto values 714 are not externally readable, except one-at-a-time through the on-board continuous display 720, and only at a pace allowed by the auto-sequencing clock 712. In the embodiments presently envisioned, a full list of the table of crypto values 714 would require three years to be metered out completely.

Figure 8:
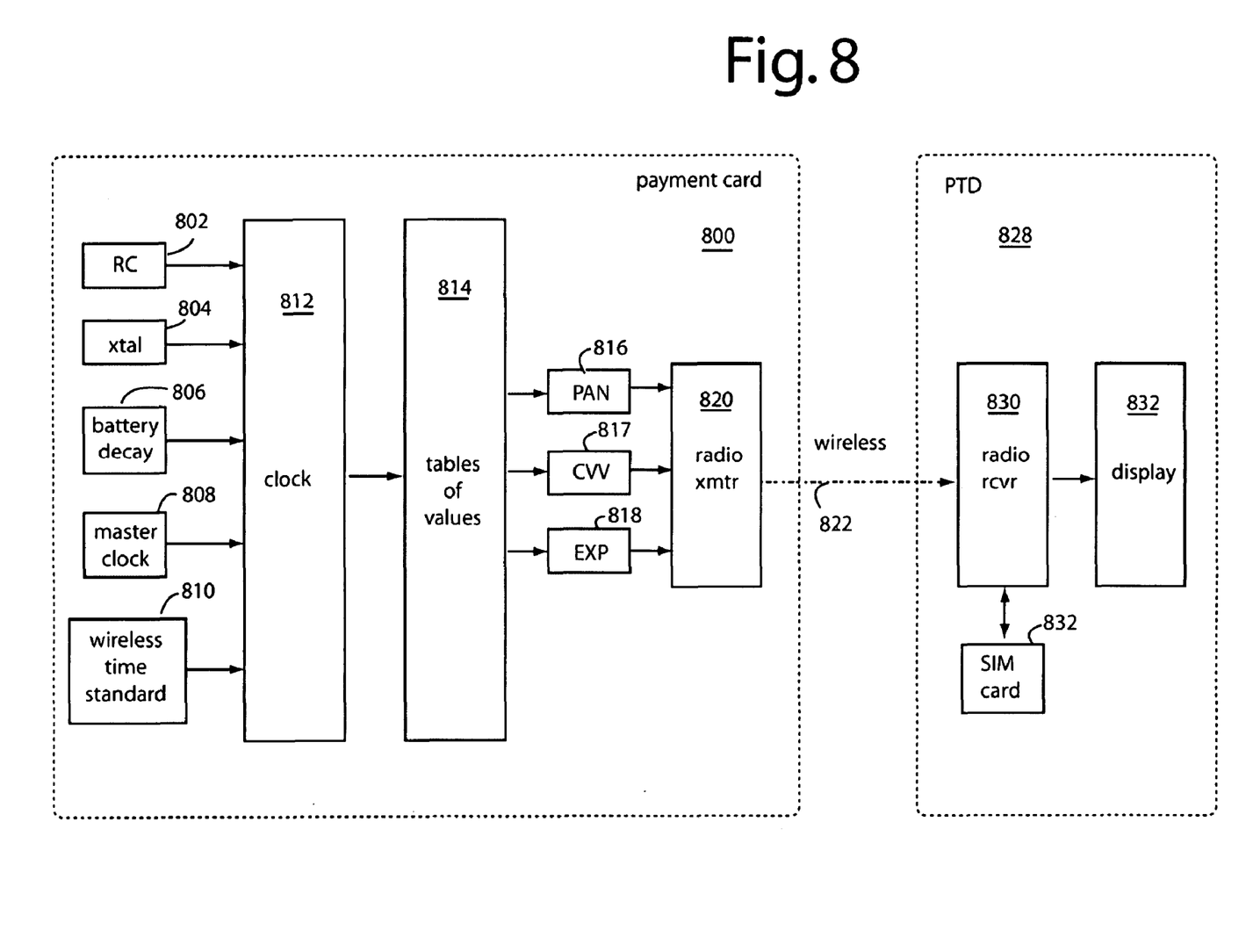
FIG. 8 is a functional block diagram of a payment card embodiment of the present invention in which resistor-capacitor, crystal, battery decay, master clock, and wireless time standards are used to control a clock that sequences through a table of crypto values that are then radioed to a personal trusted device that is used to display the PAN+CVV+EXP fields for a financial transaction.

FIG. 8 represents a payment card embodiment of the present invention, referred to herein by the general reference numeral 800. Payment card 800 includes a resistor-capacitor (RC) 802, a crystal (XTAL) 804, a battery decay 806, a master clock 808, or a wireless time standard (WWV) 810 that control an auto-sequencing clock 812 to step through an ordered table of crypto values 814. The selected table values that are then used to sprout the PAN+CVV+EXP fields 816-818 for secure relay by a radio transmitter 820. A wireless transmission 822 can be accomplished by BLUETOOTH, RFID, WiFi, GSM, SMS, or any number of wireless mechanisms that can privately and securely deliver encoded PAN+CVV+EXP fields 816-818 to a personal trusted device (PTD) 828. Which wireless service is best will probably be dictated by battery life concerns for the payment card 800. But payment card 800 need no longer fit or appear to be in a credit card format, and could even be resolved to a key-fob that is tethered to a cellphone. It would however need to fit the standard credit card format and appearance if equipped with a magnetic stripe for card-present transactions at merchant locations with legacy card readers.

In one embodiment, the PTD 828 is a standard GSM mobile telephone with a tri-band radio receiver 830. A subscriber identity module (SIM) 832 secures private communication, and adds one more security factor the authentication of the particular user of payment card 800. A conventional cellphone display 832 provides decoded PAN+CVV+EXP fields 816-818 in the clear to the user which are needed to complete a financial transaction.

In an alternative embodiment, contactless readers are employed to sequence in new tables, to update the cards, to add additional values, to add a key that is used locally in the card to transform cryptograms, and others that would allow an issuer to field-update a card without the usual reissuance costs, etc.

The particular mix of values programmed permanently into the ordered table of crypto values 814 is unique to the particular payment card 800 and of no value in compromising any other payment card. The whole list of values in the ordered table of crypto values 814 are not externally readable, except one-at-a-time through the display 832 on the PTD 828, and only at a pace allowed by the auto-sequencing clock 812. In the embodiments presently envisioned, a full list of the table of crypto values 814 would typically require three years to be metered out completely.

How the table of values 814 are ordered is a matter for the issuer to decide, and how the range of different values are computed depends on the seeds and algorithms employed.

Figure 9:
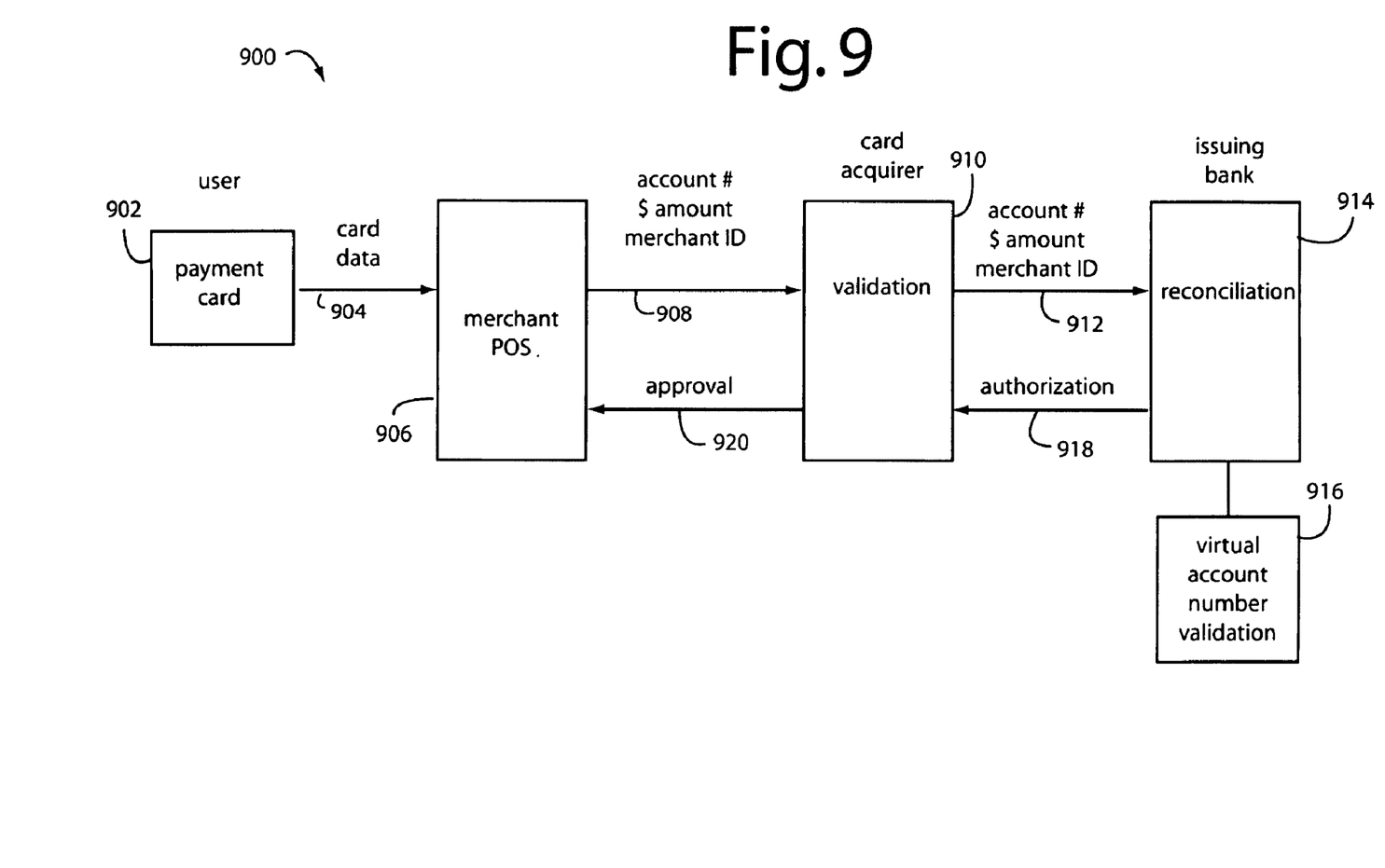
FIG. 9 is a functional block diagram of a virtual account number payment card processing system embodiment of the present invention.

FIG. 9 illustrates a virtual account number payment card processing system embodiment of the present invention, and is referred to herein by the general reference numeral 900. The system 900 uses a payment card 902 that is very similar to payment card 100 (FIG. 1). That is, payment card 902 is able to change its displayed card data 904 that is entered by a merchant point-of-sale (POS) 906. A virtual account number (VAN) is constructed from PAN+CVV+EXP values.

The merchant POS 906 performs various data operations and checks on the card data 904. Once the merchant POS 906 has determined the card data 904 is good, an approval request message 908 is sent to a card acquirer 910. Such message includes the user account number, dollar amount of the transaction, and merchant identification (ID).

The validation processing center 910 provides regional high speed network servers that are often operated by third parties and not the issuing banks. The validation processing center 910 checks to see if the user card 902 is not stolen or lost, and other first level account validation. It may also have cached some information from an issuing bank about this user account if the account has been processed before very recently. For example, an exclusion list.

A card acquirer approval request message 912 is sent to an issuing bank 914. It also includes the user account number, dollar amount of the transaction, and merchant identification (ID). The user virtual account number is cryptographically checked for validity in a processor 916. The user account checked to see if adequate funds are available. If so, an authorization message 918 is returned. A reconciliation of the user account is made and the merchant's account is credited within a day or two. The card acquirer 910 records the issuing-bank authorization and forwards an approval message 920. The merchant point-of-sale merchant POS 906 displays the approval and an authorization code, and the transaction is completed. The virtual account number validation processor 916 then adds the number just used to the exclusion list so that it cannot be used again. The payment card 902 also discards this number and readies a new number according to an enciphering scheme.

It is critical to note that the payment card 902 is completely autonomous, and requires no feedback or other data return from the rest of the system. This is necessary in order to have the payment card 902 work within the legacy payment systems now in place.

In an example of a Citibank VISA card, the first digit identifies the card as a Visa (5), and the CitiBank routing number is identified in the next 4 digits (4661). The user's account number is 005267198, for example, with a check digit of "3". This number can be fixed to be able to identify the user's account by some number, whether it is the discretionary data field, or the PAN field.

The expiration date is fixed and does not change so the transaction network can qualify prior to bank authorization, and prevent unnecessary network loading.

Asymmetric cryptography can increase the statistical odds greatly, as would the use of camouflage cryptography. An important aspect of a dynamic CVV field is that the statistical odds are always associated with each card. With ten million unique cards, the actual number of dynamic numbers is around 10-million times 100-million to one billion. That is a very large number, and those numbers are unique and not repeating. The CVV field can be used security purposes since the statistical odds are so high.

A dynamic numerical analysis (DNA) server can decrypt the CVV number and forward the real CVV number to the bank server, which will then process the transaction. The DNA server can remain within the issuer processing center, or a third party. The DNA server may also check that the dynamic number seed value has not been previously used. If it was, such indicates a fraudulent transaction. However, due to batch processing methods of some merchants, a tolerance of +5 transaction sequences is more pragmatic. That is, the number can vary with five predicted transactions and still be considered a valid transaction.

The dynamic number seed value should be valid and predicted. If it is not valid, then that indicates a hacker guessing the number. The bank should invalidate the card immediately.

An enciphering process can be used for a virtual account number generator. As one example, a seed value is fed to a random number generator (RNG). This fills a seed list and an exclusion cache is used to eliminate previously used and discarded numbers. An initial changing vector is sent to a DES/AES processor. A UUID PAN is coupled with an expiration date. The UUID is a secret key generated from a session key. A DES/AES encryption result is concatenated with a random number. An open standard cryptogram camouflage obfuscation process can be used to packet a message. A converter is used to reduce the message size. A processor does a final data parsing and LRC-check digit computation. A virtual account number is generated to the user display and possibly a magnetic strip, for example.

Figure 10:
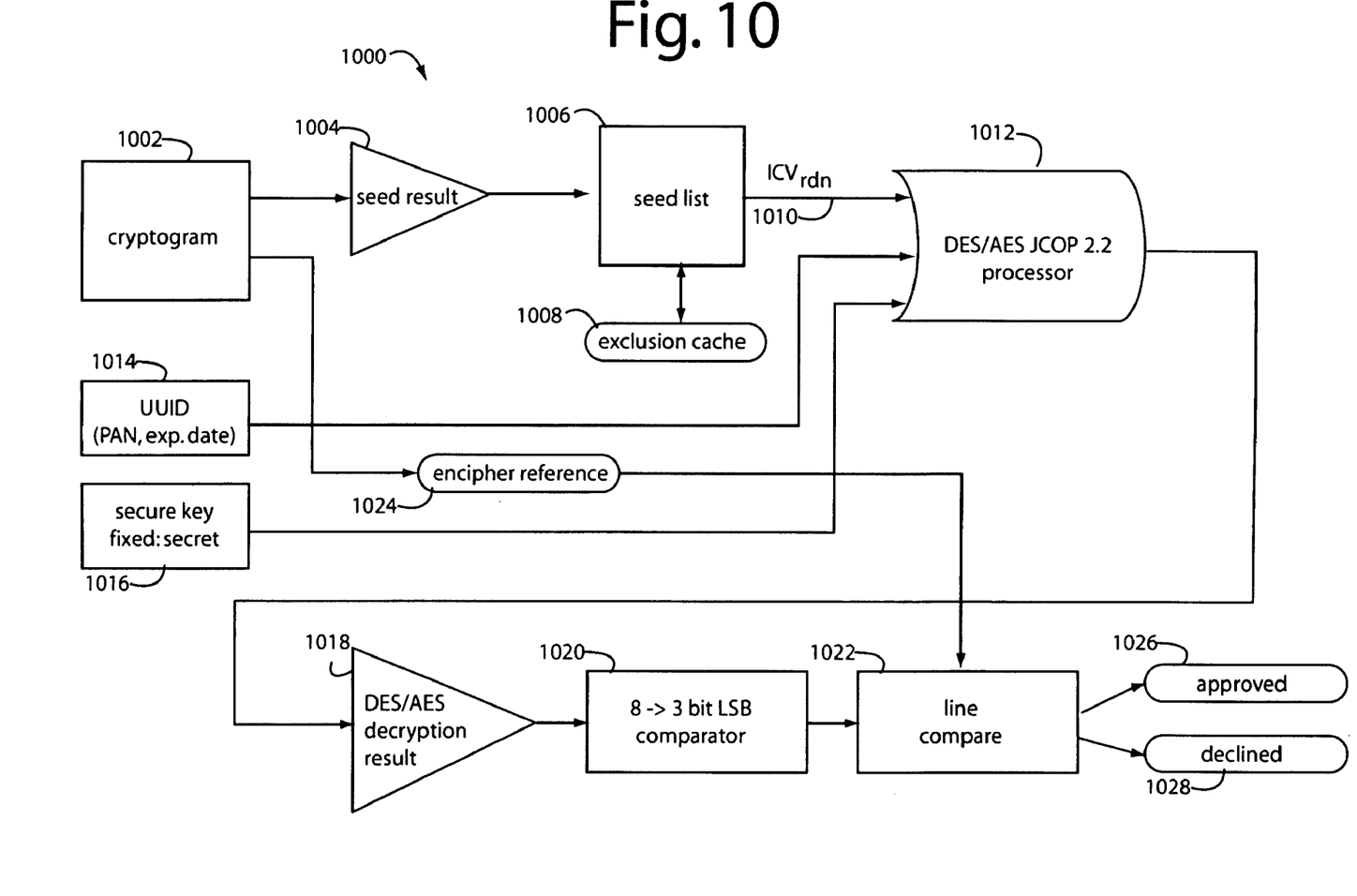
FIG. 10 is a functional block diagram of a deciphering process that can be used for the VAN validation processor of FIG. 9.

FIG. 10 represents a deciphering process 1000 that can be used for the VAN validation processor 916 of FIG. 9. The deciphering process 1000 receives a cryptogram message 1002 in a transaction authorization request. A seed result 1004 is sent to a seed list 1006. An exclusion cache 1008 is used to invalidate previously used and discarded virtual account numbers. A random ICV 1010 is forwarded to a DES/AES processor 1012. A PAN and expiration date are received in a UUID 1014. A secure key 1016 is also input to the DES/AES processor 1012. A DES/AES decryption result 1018 is sent to a comparator 1020. An encipher reference 1024 is used in a line compare 1022. The result is either an approved response 1026 or a declined response 1028 is returned to the merchant POS 906, for example.

In an example of an online cryptographic analysis of personal account numbers and expiration date fields, sixteen PAN digits are assumed, of which seven are dedicated. Of these dedicated digits, the first is the card system assignment. The next five digits are bank routing numbers, and the last digit is a check digit. There are therefore nine PAN digits that are available for bank account number assignment. There are also four expiration date digits assigned by the bank.

The standard MasterCard/Visa merchant-agreed financial transaction requirements are such that offline transactions will always use the PAN, EXP, and CVV data. The usage of a nine digit CVV number has already been demonstrated by a prototype financial transaction simulator to have eight orders of magnitude statistical probabilities in security.

Online transactions with some embodiments of the present invention depend on a combination of the PAN and EXP digits displayed on the card. As an example, suppose a typical credit card issuing bank would like to issue five million MasterCards with virtual PAN numbers, and each with four orders of magnitude security. Such level of security equals that of "PIN level" security, and is widely accepted as adequate. A typical issuer issues cards with a twenty-four month expiration date.

In such case, a fixed PAN field of five digits and a fixed expiration date field of three significant digits when combined will obtain seven orders of magnitude of unique number assignment for the five million account holders.

For each account holder, a variable PAN field of four digits, excluding the check-digit, will provide four orders of magnitude security. Such field is sequenced by a cryptoprocessor using a secure method. The financial transaction security increases with each successive transaction because the number of remaining valid codes shrinks. Each code generated is added to an exclusion cache and removed from the statistical probability table.

A chemical dye-diffusion, electrophoresis, MIRASOL™ (Qualcomm MEMS Technologies, Inc.) type display, or similar low cost and low power digital display is used to visually display the PAN+CVV+EXP numbers generated on the payment cards. These number can then be verbally confirmed for telephone purchases, or copied into a web browser for online purchases.

The four month-year (MMYY) date digits have a shared customer probability of:

---

M1, first digit = 33% of being a "1", and 67% of being a "0";
M2, second digit = 10% of being any number, and 8% being any number linked to Y2;
Y1, first digit = 100% (for next 4-5 years, and therefore not useful)
Y2, second digit = 33% (due to mid-year card issuance).

---

Security can be improved by extending the card issuance to five years. In practice, many cards are changed or cancelled prior to their expiration date. The Bank identifier number also has an influence on the level of security, some banks are identified with four digits while others are identified by five. Therefore, about 1.5%-2% of a five million customer base share three significant date digits. This is about 100,000 common accounts. Five additional significant digits are needed for discriminating amongst accounts.

An embodiment of the present invention has a PAN field of five fixed account digits that compliment three significant expiration date digits. This combines for a total of seven orders of magnitude (ten million) unique account numbers. The PAN field has four variable digits, plus a dependent variable check-digit for use by the cryptoprocessor. The display provides numbers sequences with four orders of magnitude security level. The contributions to security by the check-digit are unknown, and assumed to be zero.

Each generated number used in a financial transaction is copied to a secure exclusion cache within the cryptoprocessor purse application. Such excluded number cannot be used in any future transaction associated with the same card.

A bank dynamic number process server is used to analyze the numbers submitted for transaction approval and determine if there is a fraud profile. Such a profile may include three consecutive attempts to submit an invalid number, two concurrent attempts of submission with the same number, etc. In this event, the card user would be notified, the card would be cancelled, and a new card automatically sent to the user. This statistical profiling of fraud is more effective than present methods because of the virtual account number capability of the card.

A typical card can have a PAN and expiration date sequence where the first six digits are industry-assigned system and bank routing numbers, X is the virtual number, and Y is the check-digit. For example, 5561 6504 248X XXXY 12/06. Valid virtual account numbers therefore would include:

---

5561 6504 2481 9345 1206, and the next sequence may be,
5561 6504 2489 5468 1206, and the next sequence may be,
5561 6504 2483 1634 1206, etc.

---

The cryptographic method disclosed that will support a card base of five million unique account holders, within existing MasterCard/Visa card numbering standards, and allow four orders of magnitude security that can be applied offline or online that utilize the fields presently analyzed by the issuing bank and the merchant acquirer network.

Such cryptographic method can be transparent to existing financial transaction network processing. Only the issuing bank can see or control the analysis and approval processes. Statistical models can be developed to profile fraud and minimize the impact upon the bank and the account holders.

In summary, payment card embodiments include a plastic carrier with the dimensions of a credit card. A table memory is disposed within the plastic carrier and is able to be permanently written once during card personalization with an ordered series of cryptograms. An auto-sequencer is disposed within the plastic carrier and is connected to the table memory. It provides for an ordered selection of an individual cryptogram that was previously written during the card personalization. An electronic display is also disposed within the plastic carrier to visually display to a user a personal account number (PAN), a card verification value (CVV), and/or an expiration date (EXP) derived from the individual cryptogram selected by the auto-sequencer.

Alternative embodiments further comprise a magnetic stripe disposed on the plastic carrier and provide for a magnetic recording of a virtual account number (VAN) derived from the PAN, CVV, and/or EXP, that is useful in a financial transaction with a merchant. A QStripe-type magnetic device, as produced by QSecure, Inc. (Los Altos, Calif.) is disposed within the magnetic stripe and provides for at least some part of the VAN to be autonomously updated in the magnetic recording without assistance from an external device.

Each new VAN belongs to a sequence of numbers that can be predicted and used to authenticate a transaction instigated through an external legacy card reader. Such payment card further comprise a virtual account number (VAN) derived from the PAN, CVV, and/or EXP, which is continuously visible on the display long enough to enable a payment transaction which was not instigated by an external legacy card reader. A 3CVV display can be included in the electronic display, for continuously showing current and changing CVV values. A pair of PAN and EXP values are permanent and unchanging, and are made readable by embossing or printing.

In another embodiment, a 4DBC display is included as the electronic display, and continuously shows the current and changing 4DBC values. A pair of permanent and unchanging PAN and CVV values are made readable by embossing or printing. Alternatively, a partial-PAN display is included in the electronic display, for continuously showing the current and changing portions of the PAN. A permanent and unchanging remainder of the PAN and the CVV values are embossed or printed on the plastic carrier. In yet another alternative embodiment, a full-PAN display is included in the electronic display, and continuously shows the current and changing PAN value. A pair of permanent and unchanging CVV and EXP values are embossed or printed on the plastic carrier.

A radio transmitter, such as an RFID or BLUETOOTH device, can be included for forwarding at least one of the PAN, CVV, and EXP values to a personal trusted device for display that will enable a financial transaction with a merchant. This results in 2-factor authentication, since 2 physical devices must be present for a transaction.

A payment card without its own display may include a plastic carrier and a table memory disposed within the plastic carrier. The table memory is permanently written once during card personalization with an ordered series of cryptograms. An auto-sequencer disposed within the plastic carrier is connected to the table memory, and provides for an ordered selection of an individual cryptogram that was previously written during the card personalization. A radio transmitter, or other radiation device, forwards the PAN, CVV, and EXP values to a personal trusted device with an electronic display. The user is provided with PAN+CVV+EXP combination derived from the individual cryptogram selected by the auto-sequencer.

A financial transaction system embodiment comprises a first cryptoprocessor using an algorithm to generate a table of cryptograms from a seed that are in an ordered series and that are unique and downloaded only once during personalization to a particular payment card. A second cryptoprocessor uses the same algorithm to produce a replicate table of cryptograms from the original seeds. It will also generate the ordered series that can be predicted to be visually displayed by the particular payment card in subsequent financial transactions. A validation process receives a PAN+CVV+EXP derived from individual cryptograms selected by an auto-sequencer that are continuously displayed by the payment cards to a user. A transaction decision process approves or declines a financial transaction involving the payment card according to the validity of the PAN+CVV+EXP values received, as determined by the replicate table of cryptograms. A personalization process permanently records the tables of cryptograms to a population of the payment cards. However, only the table of cryptograms and not the algorithms and seeds are accessible to the personalization bureau outside a card issuer.

Figure 11A:
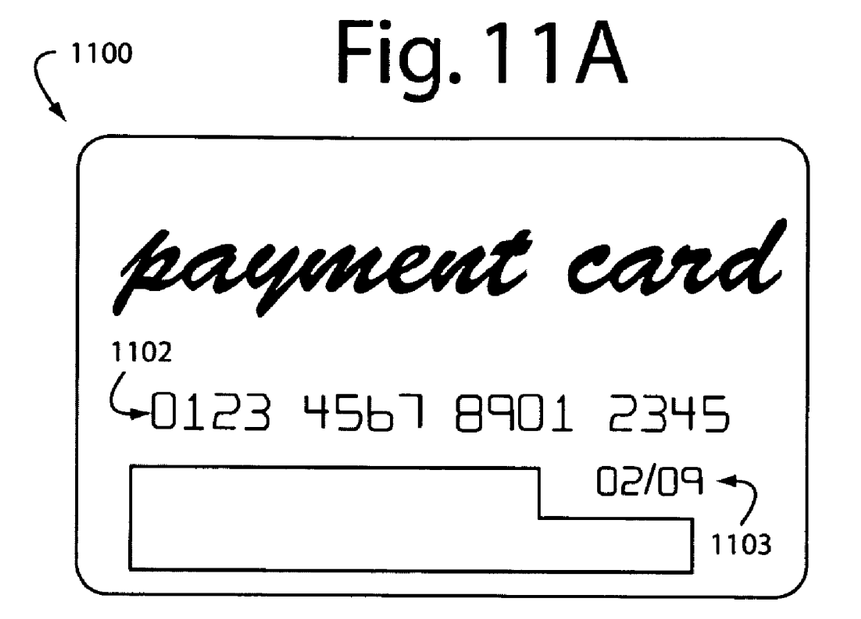
FIGS. 11A and 11B are front and back views of a 3CVV-type payment card embodiment of the present invention that uses an electronic display for the three digits of the 3CVV value and other three digits for an OTP value. Standard embossing is to for the PAN and EXP fields. A QStripe device in the magnetic stripe is not necessarily included.
Figure 11B:
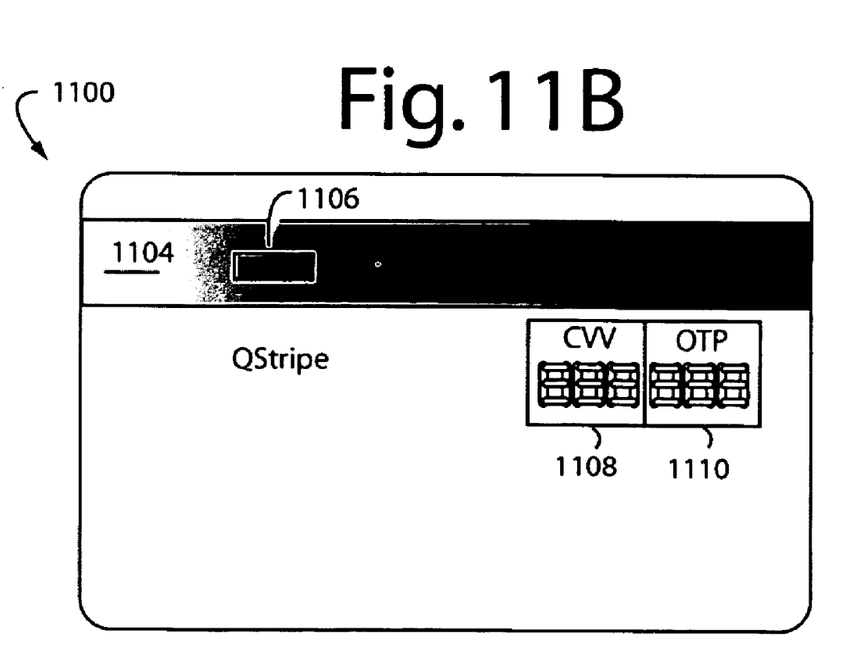

FIGS. 11A and 11B show a 3CVV-type display card 1100 in an embodiment of the present invention. In the front view of FIG. 11A, a 16-digit PAN 1102, and 4-digit EXP 1103 are embossed in the plastic as is conventional. In some embodiments, a magnetic stripe 1104 on the reverse side, as seen in FIG. 11B, includes a QStripe device 1106 that makes a few of the magnetic data bits dynamic and autonomously programmable by the card 1100 itself. A 3CVV display 1108 corresponds to user display 108 in FIG. 1. A 3-digit, for example, one time password (OTP) display 1110 is placed next to the 3CVV display 1108, and they can be read off together in ATM transactions as a PIN code to be entered. Of course, 4-digit OTP and CVV values could be used too in other embodiments.

One time passwords (OTP's) can be attached to CVV, 4DBC, PAN, and other dynamically displayed elements to produce challenge responses for online, ATM, POS, or MOTO transactions. Adding a three or four digit OTP to a four-digit 4DBC, for instance, yields a 7-8 digit number. The first and second groups of digits can be separated by digit colors, bounding boxes, legends, etc. Some embodiments of the present invention therefore combine dynamic card verification values with a OTP.

Online fraud has been correlated to theft of data from offline transactions, at a restaurant or gas station. If a fraudster manages to steal all the data, changing the 4DBC code e.g., every five minutes, and changing the OTP too even a rapid replay attack will be thwarted.

In an alternative embodiment of the present invention, the dynamic 4DBC combines with an OTP to produce a dynamic PIN useful at ATMs, or in Visa's 3D Secure process. Ordinarily, if a fraudster copies a card and watches the user enter their PIN, then the account is compromised. But if the PIN includes a combination of dynamic 4DBC plus a bank proprietary OTP, then the hacker is blocked. A proprietary network password can be used on a financial display card. This is more secure than a static PIN, or a five minute window PIN. Of course, the OTP would have to be directed to the issuer or third-party processor, and we feel that fraud will push more banks to move in this expensive direction, in future.

Embodiments of the present invention include both event-based algorithm sequencing of cryptograms, and time-based algorithm sequencing of cryptograms and that are used to drive the 4DBC/3CVV values. OPT and 4DBC/3CVV values can depend on event or time sequencing.

Although particular embodiments of the present invention have been described and illustrated, such are not intended to limit the invention. Modifications and changes will no doubt become apparent to those skilled in the art, and it was intended that the invention only be limited by the scope of the appended claims.

The invention is claimed, as follows.

The invention claimed is:
1. The financial transaction system, comprising:
 a first cryptoprocessor for using an algorithm to generate a table of cryptograms from a seed that are in an ordered series and that are unique and downloaded only once during personalization to a particular payment card;
 a second cryptoprocessor for using said algorithm to produce a replicate table of cryptograms from said seed that will also be in said ordered series and that can be predicted to be visually displayed by said particular payment card in subsequent financial transactions;
 a validation process for receiving a personal account number (PAN), a card verification value (CVV), and/or an expiration date (EXP) derived from individual cryptograms selected by an auto-sequencer and continuously displayed on said payment cards to a user;
 a transaction decision process for approving or declining a financial transaction involving said payment card according to the validity of the PAN+CVV+EXP values received as determined by said replicate table of cryptograms; and
 a personalization process for permanently recording said tables of cryptograms to a population of said payment cards,
 wherein, only said table of cryptograms and not said algorithms and seeds are accessible to a personalization bureau outside a card issuer.

\* \* \* \* \*